Figure 1:
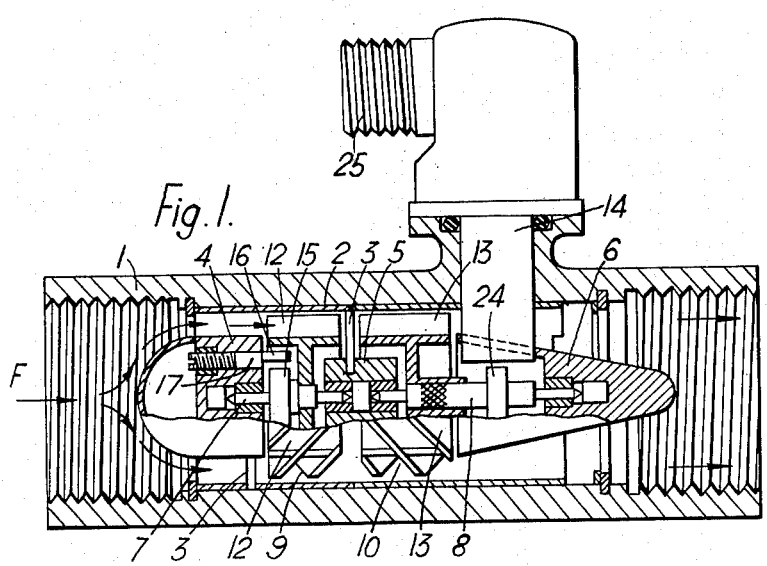

March 22, 1966  E. H. W. ALLEN  3,241,366

FLUID-FLOW METER

Filed Jan. 16, 1958

Inventor:
Eric Harold William Allen
By:
Baldwin & Wight
Attorneys

United States Patent Office 3,241,366
Patented Mar. 22, 1966

3,241,366
FLUID-FLOW METER
Eric Harold William Allen, Corncrake Close, Stopsley, Luton, England, assignor, by mesne assignments, to Rockwell Manufacturing Company, Pittsburgh, Pa., a corporation of Pennsylvania
Filed Jan. 16, 1958, Ser. No. 709,228
Claims priority, application Great Britain, Jan. 17, 1957, 1,852/57
7 Claims. (Cl. 73—230)

This invention relates to fluid flow meters of the type comprising a bladed rotor which is immersed in the fluid flow so as to be driven or rotated by the flow: such meters are commonly referred to as "inferential" meters and the rotor blades are most commonly of helical form.

The forces operating on the rotor of such meters are:
(a) The frictional torque which is sensibly constant for all rates of flow.
(b) The torque necessary to operate the registering part of the meter which is also sensibly constant for all rates of flow.
(c) The driving torque generated by the rotor which is proportional to the square of the component of the fluid velocity normal to and relative to the rotor blades.

Item (c) will always equal item (a) plus item (b) for steady conditions. In an ideal meter, items (a) and (b) would be zero and the rotor would attain a speed, for a given fluid flow, at which (c) was also zero; that is, the velocity of the rotor blades would be such as to make zero the relative fluid velocity normal to the blades. In a practical meter, however, items (a) and (b) are not zero and the rotor turns at a speed which is less than the speed of the corresponding ideal meter by an amount sufficient to make item (c) equal to the sum of items (a) and (b). At high rates of flow, a large value of item (c) is obtained from a small percentage change of rotor speed; at lower flow rates, however, the necessary value of item (c) is obtained only by a large percentage reduction of speed (compared with an ideal meter) thus resulting in a reduction in the accuracy of the meter.

This reduction in the accuracy of such meters is well-known and various proposals have already been made to overcome the defect. It is the main object of the invention to provide an improved arrangement to avoid that defect or at least to minimize it.

In carrying out the present invention as broadly stated, means controlled by the rate of flow of the fluid are provided so so increase the impact of the fluid on the rotor as the rate of flow decreases as to maintain the desired equality of the sum of items (a) and (b) on the one hand and item (c) on the other hand, while keeping the relationship between rotor speed and fluid velocity sensibly constant over an extended range of flow rates.

In the preferred arrangement, the impact-varying means comprises a second rotor adjacent to the upstream end of the first rotor and coaxial with it: the blades of the rotors are arranged to cause the fluid flow to rotate the two rotors in opposite directions and the blades of the second rotor operate to direct the fluid flow of the blades of the first rotor.

In a preferred construction, there is employed a second rotor (which will be termed a "compensating" rotor as compared with the first rotor which will be termed a "measuring" rotor) which is arranged to have similar loading characteristics (i.e., characteristics corresponding to items (a) and (b)) to those of the measuring rotor but which has its blades disposed to cause the rotor to rotate in the direction opposite to that of the measuring rotor. The two rotors are disposed adjacent one another in the fluid flow about a common axis of rotation, so that as the rate of flow decreases, the compensating rotor will increasingly modify the condition of flow impacting on the measuring rotor and impart to it additional power to maintain over the range of flow the value of item (c) in relation to items (a) and (b) together; in other words, to make good the loss of item (c) at decreasing flow rates in relation to the sensibly constant items (a) and (b).

One or other or both of the rotors (usually only the compensating rotor) is equipped with means by which its loading (i.e., reactance to turning) can be adjusted to the necessary relation with the loading of the other to produce the effect required by the invention.

Figure 2:
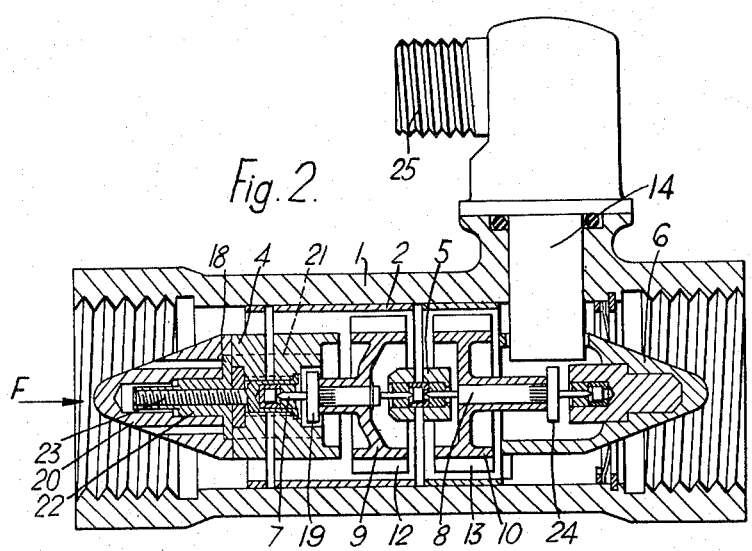

Such an arrangement is illustrated in the accompanying drawing in which FIGURE 1 is a longitudinal sectional elevation of one construction and FIGURE 2 is a similar view of a modified construction.

The meter shown in FIGURE 1 comprises a duct or pipe section 1 which is arranged to be connected in a pipe line for the flow to be measured. The section 1 is fitted in its bore with a sleeve 2 having spiders which carry components 4, 5, 6 having bearings to carry the spindles 7, 8 of rotors 9, 10 which are thus carried for independent rotation coaxially in the bore of the section 1.

The rotors 9, 10 are disposed one behind the other in the section 1 and their blades 12, 13 are disposed at opposite helix angles so that the flow (indicated by the arrow F) through the duct 1 will cause the rotors to rotate in opposite directions.

The rotor 10 (which is termed the measuring rotor) is arranged by its rotation to operate a registering or transmitting mechanism housed in a housing 14 mounted in the section 1: the rotor 9 (which is termed the compensating rotor) is disposed upstream of the measuring rotor and its rotation under the impact of the fluid flow is controlled by equipping its spindle 7 with a permanent magnet 15 about which are grouped pins 16 of ferromagnetic metal, the pins being carried by the component 4. These pins exert a magnetic drag on the magnet 15 and hence set up a loading on the rotation of the rotor 9.

By arranging this loading to be related to the load (i.e., items (a) and (b)) imposed on the rotation of the rotor 10, the energy absorbed from the compensating rotor 9 can be made to compensate that absorbed from the measuring rotor 10 within the limits required. Under normal conditions of flow, both rotors 9, 10 will rotate at the same speed but in opposite directions, each causing a negligible deflection of the flowing fluid. As the flow of the fluid is reduced to the point where the forces (a) and (b) become large in relation to the driving force equivalent to item (c) available from the flow, the compensating rotor 9 will tend to slow down and this causes greater relative deflection of the fluid in its passage through the compensating rotor 9 in order to provide the necessary change of momentum to maintain rotation. The fluid will thus be caused to enter the measuring rotor 10 with an added swirl velocity which would normally tend to speed up the measuring rotor. However, the swirl merely provides the additional power required to maintain the measuring rotor 10 at its correct speed and the value of the item (c) in the same relationship to the sum of items (a) and (b). In this way the accuracy of registration is maintained down to a flow rate which in the case of a single rotor would result in a reduction of registration accuracy.

As has been stated, the loading exerted on the compensating rotor 9 is provided in the arrangement shown by magnetic drag exerted between the magnet 15 and the pins 16: in order to enable this loading to be adjusted to enable the compensating rotor 9 to be "matched" to the measuring rotor 10, the pins 16 are formed eccentrically on stems 17 which can be turned in the component 4 so as to vary the separation between the pins and the magnet 15 and hence the tightness of magnetic coupling.

Referring now to FIGURE 2, this shows an arrangement which is in general similar to that shown in FIGURE 1, the corresponding parts being given corresponding reference numerals. In the construction shown in FIGURE 2 however, an improved form of variable loading for this compensating rotor 9 is employed. This arrangement comprises a permanent magnet 18 which is carried by the fixed bearing component 4, and a nickel disc 19 which is mounted on the spindle 7 of the compensating rotor 9.

The magnetic field of the magnet 18 is controlled by ferromagnetic pieces 21 which form inserts in the fixed part 4 which is of non-magnetic material and by a ferromagnetic piece 22 which is screw threaded internally to engage a screw thread on a screwed rod 23, the piece 22 being carried by a component 20 also of non-magnetic material. By turning the component 20, it and the insert 22 are caused to move axially along the rod 23: thus the separation between the inserts 21 on the one hand and the insert 22 on the other hand is varied and so the distribution of the magnetic field in the inserts 21 and thus the hysteresis drag exerted on the disc 19 is varied.

The rotation of the measuring rotor 10 can be transmitted to the registering or transmitting mechanism in the housing 14 in any usual way: as shown, the spindle 8 of the rotor is fitted with a magnet 24 which as the rotor 10 turns, operates in the well-known manner through a polarized armature to actuate a switch, the armature and the switch being enclosed within the housing 14: the impulses from the switch are transmitted via a connector 25 to a remote counter to provide a measure of the total number of revolutions of the rotor system and thus of the total flow.

The invention is of course applicable to meters for whatever purpose they are required in the measurement of fluid flow, i.e., gas and liquid flow: one especially important application is for use in measuring the flow of liquid fuel on aircraft.

I claim:
1. A fluid flow meter comprising a flow conduit, a bladed measuring rotor mounted in the conduit with its blades inclined in one direction and being adapted to be rotated by fluid flow through said conduit, a fluid flow indicator, means transmitting rotation of the measuring rotor to the indicator, a bladed compensating rotor mounted in the conduit upstream of the measuring rotor with its blades inclined in the opposite direction and being free of mechanical driving connection with said measuring rotor so as to be rotatable relatively to said measuring rotor, said compensating rotor being positioned adjacent said measuring rotor whereby fluid discharged from said compensating rotor is directed by said compensating rotor blades to flow directly to and impinge upon said measuring rotor blades, the blades of the compensating rotor being disposed to rotate said compensating rotor in a direction opposite to the direction of rotation of said measuring rotor and means to restrain the free rotation of the compensating rotor whereby its inclined blades react to direct the fluid flow against the blades of the measuring rotor at an angle to the direction of flow through the conduit with increasing impact as the rate of flow through the conduit decreases.

2. A fluid flow meter according to claim 1 in which said measuring rotor and said compensating rotor are mounted coaxially in said flow conduit.

3. A fluid flow meter according to claim 1 in which said means to restrain free rotation of said compensating rotor comprises a magnetic rotation damping means.

4. A fluid flow meter according to claim 3 in which said magnetic damping means comprises a magnet connected to said compensating rotor for rotation conjointly therewith, and a plurality of pins of magnetic material fixed with respect to said conduit and surrounding said magnet.

5. A fluid flow meter according to claim 4 in which said pins have eccentric mounting stems, whereby turning of said stems and pins adjustably positions the said pins relatively to said magnet.

6. A fluid flow meter according to claim 2 in which said means to restrain free rotation of said compensating rotor comprises hysteresis-drag rotation damping means.

7. A fluid flow meter according to claim 6 in which said hysteresis-drag rotation damping means comprises a disc connected to said compensating rotor for rotation conjointly therewith, a magnet mounted in said conduit in axial alignment with and spaced from said disc, and means for adjusting said magnet axially of said disc.

References Cited by the Examiner
UNITED STATES PATENTS

| | | | |
|---|---|---|---|
| 1,729,144 | 9/1929 | Banning | 73—230 |
| 2,299,406 | 10/1942 | Potter | 73—231 X |
| 2,602,330 | 7/1952 | Kollsman | 73—194 |
| 2,857,761 | 10/1958 | Bodge | 73—194 |

RICHARD C. QUEISSER, *Primary Examiner.*

C. A. CUTTING, ROBERT L. EVANS, *Examiners.*